United States Patent
Russo et al.

(10) Patent No.: US 7,330,183 B1
(45) Date of Patent: Feb. 12, 2008

(54) TECHNIQUES FOR PROJECTING DATA MAPS

(75) Inventors: Michael J. Russo, Berkeley, CA (US); Michaelson Britt, Montreal (CA); Daniel Lévesque, Montreal (CA); Ian A. Nies, San Francisco, CA (US); Kelcey Privett, Austin, TX (US); Rodolfo J. Cazabon, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 174 days.

(21) Appl. No.: 11/198,050

(22) Filed: Aug. 5, 2005

Related U.S. Application Data (60) Provisional application No. 60/599,432, filed on Aug. 6, 2004.

(51) Int. Cl.
*G06T 15/00* (2006.01)
(52) U.S. Cl. ............... 345/428; 345/427; 345/581
(58) Field of Classification Search ........... 345/419, 345/420, 698, 428, 3.3, 427, 581, 582
See application file for complete search history.

(56) References Cited

U.S. PATENT DOCUMENTS

| | | | | |
|---|---|---|---|---|
| 5,894,308 | A * | 4/1999 | Isaacs | 345/420 |
| 6,300,956 | B1 * | 10/2001 | Apodaca et al. | 345/619 |
| 6,441,816 | B1 * | 8/2002 | Nguyen et al. | 345/420 |
| 7,081,893 | B2 * | 7/2006 | Cerny | 345/428 |
| 2003/0128210 | A1 * | 7/2003 | Muffler et al. | 345/428 |

* cited by examiner

*Primary Examiner*—Xiao Wu
*Assistant Examiner*—Joseph Barnes
(74) *Attorney, Agent, or Firm*—Patterson & Sheridan, L.L.P.

(57) ABSTRACT

A method for constructing mapping coordinates for a high-resolution graphics model includes the steps of expanding a projection cage to substantially encompass both a low-resolution graphics model and the high-resolution graphics model, and defining a volume that extends from a polygon of the projection cage through a corresponding polygon of the low-resolution graphics model. The method also includes the steps of determining points within an area on a surface of the high-resolution graphics model defined by an intersection of the volume and the high-resolution model, and, for each point where the corresponding polygon is the closest polygon of the low-resolution graphics model to the point, projecting the point to the corresponding polygon to define a projection point on the corresponding polygon.

20 Claims, 8 Drawing Sheets

TECHNIQUES FOR PROJECTING DATA MAPS

CROSS-REFERENCE TO RELATED APPLICATIONS

This application relates to, and claims the priority benefit of, U.S. Provisional Patent Application No. 60/599,432, titled "Techniques for Generating and Projecting Data Maps," filed on Aug. 6, 2004. The subject matter of the related application is herein incorporated by reference.

BACKGROUND OF THE INVENTION

1. Field of the Invention

Embodiments of the present invention relate generally to computer graphics and more specifically to techniques for projecting data maps.

2. Description of the Related Art

In computer graphics, a rendering engine typically renders a three-dimensional (3D) image or scene from one or more 3D "wire frame" model or "mesh" that a graphics artist or other user builds using graphics development software. Oftentimes, the rendering engine maps the content of a bitmap, such as a two-dimensional (2D) image file or texture map, onto the one or more 3D meshes to add desired "look and feel" details to the rendered 3D image or scene. For example, if a low-resolution 3D mesh is a cylinder, then the content of a 2D image file containing an image of tree bark may be mapped to the mesh to produce a 3D image that appears as a tree trunk. The user is required to create mapping coordinates that map the vertices of the mesh to the 2D image file that enable the content of the 2D image file to be applied correctly to the mesh.

When designing an image or scene, users typically prefer to use high-resolution 3D models to increase the level of detail of the rendered 3D image or scene. A high-resolution 3D model includes relatively more vertices, lines, polygons (e.g., triangles) and the like than a low-resolution 3D model, which enables higher resolution content to be mapped onto the high-resolution 3D model, resulting in a higher level of detail upon rendering. One drawback of building an image or scene using a high-resolution 3D model, however, is that a manual mapping between the vertices of the high-resolution 3D model and corresponding locations within a bitmap must be performed in order to map the content of the bitmap onto the high-resolution 3D model. Since, by definition, a high-resolution 3D model includes a relatively large number of vertices, the manual mapping process is tedious and time consuming. High-resolution 3D models also have mapping coordinates of higher complexity, further complicating the manual mapping process. In addition, once the manual mapping is completed, no changes to the high-resolution 3D model (e.g. repositioning or reshaping a polygon or adding a polygon) can be made unless the manual mapping is updated to accommodate the changes. Other drawbacks to using high-resolution 3D models are that more work is created for users because, for example, the users have to design the 3D image or scene with a relatively larger number of polygons, and system performance is degraded because manipulating 3D models with more data requires more processing power.

As the foregoing illustrates, what is needed in the art is a way to map the content of a bitmap to a 3D model that enables users to design a 3D image or scene using low-resolution 3D models, instead of high-resolution 3D models, without substantially degrading the quality of the rendered 3D image or scene, and decreases the difficulty of updating the mapping coordinates if the 3D models making up the 3D image or scene are modified.

SUMMARY OF THE INVENTION

One embodiment of the present invention sets forth a method for constructing mapping coordinates for a high-resolution graphics model. The method includes the steps of expanding a projection cage to substantially encompass both a low-resolution graphics model and the high-resolution graphics model, and defining a volume that extends from a polygon of the projection cage through a corresponding polygon of the low-resolution graphics model. The method also includes the steps of determining points within an area on a surface of the high-resolution graphics model defined by an intersection of the volume and the high-resolution model, and, for each point where the corresponding polygon is the closest polygon of the low-resolution graphics model to the point, projecting the point to the corresponding polygon to define a projection point on the corresponding polygon. Geometry information and mapping data for each projection point is determined from the geometry information and mapping data associated with the vertices of the corresponding polygon. The geometry information and mapping data associated with each projection point is then transferred to the point on the surface of the high-resolution graphics model corresponding to the projection point.

One advantage of the disclosed method is that it provides an efficient way to determine the mapping coordinates of a high-resolution 3D model based on the mapping coordinates of a low-resolution 3D model. Once the mapping coordinates of the high-resolution 3D model are determined, the content of a bitmap previously mapped to the low-resolution 3D model may be applied directly to the high-resolution 3D model using one or more methods known in the art. The method enables a user to develop a 3D image or scene using a low-resolution graphics model and then add detail to the 3D image or scene by mapping the content of a bitmap onto a high-resolution graphics model corresponding to the low-resolution graphics model in the manner described. The resulting 3D image or scene includes a level of detail substantially similar to the level of detail that would exist had the 3D image or scene been developed only with a high-resolution 3D model. Another advantage is that, if the user modifies the low-resolution 3D model after the manual mapping between vertices of the low-resolution 3D model and corresponding locations within the bitmap has been performed, then the only remapping required is between the vertices of the low-resolution 3D model and corresponding locations within the bitmap. The resulting remapping typically results in substantially less work than the prior art approach of having to manually remap the vertices of a high-resolution 3D model and corresponding points within the bitmap.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
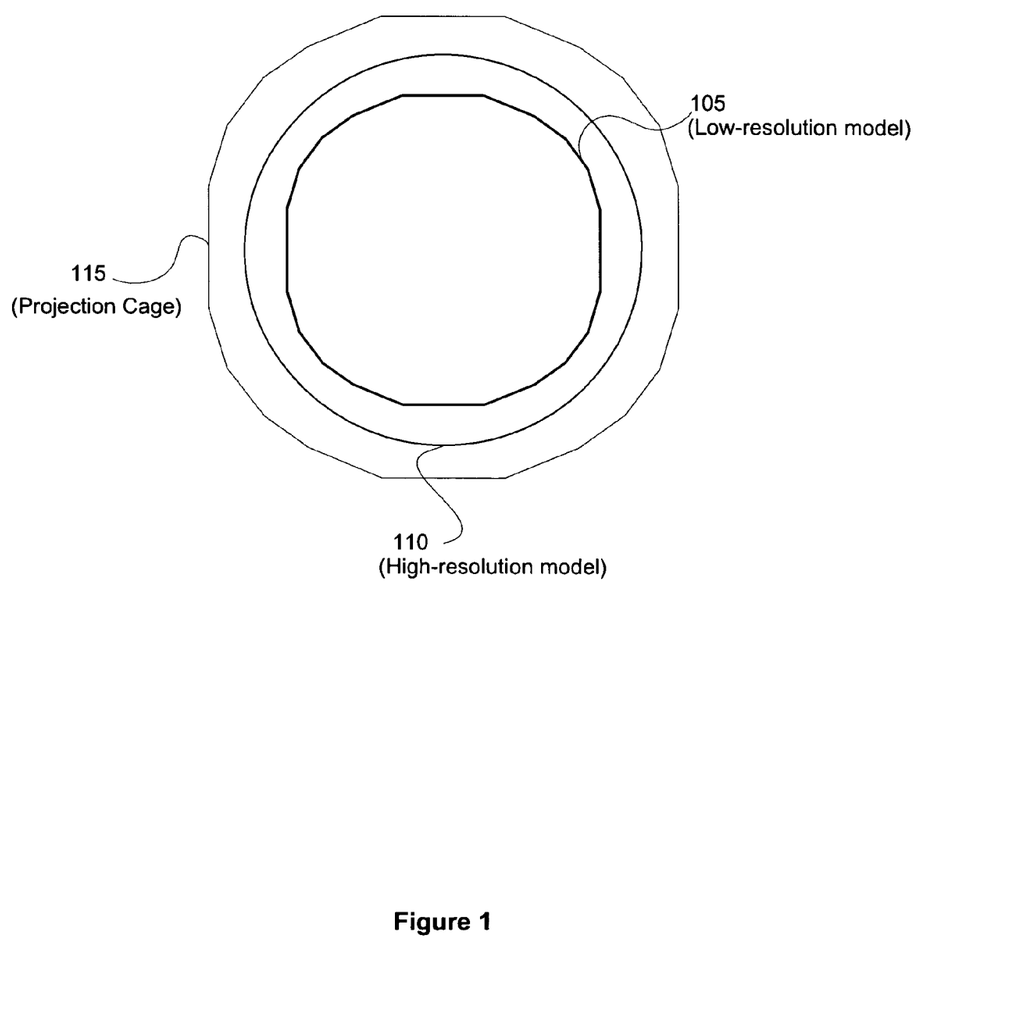
FIG. 1 is a conceptual diagram illustrating a cross-sectional view of a low-resolution 3D model of a sphere, a cross-sectional view of a high-resolution model of a sphere and a projection cage, according to one embodiment of the invention.

FIG. 1 is a conceptual diagram illustrating a cross-sectional view of a low-resolution 3D model of a sphere 105, a cross-sectional view of a high-resolution model of a sphere 110 and a projection cage 115. The low-resolution and high-resolution 3D models of the sphere 105, 110 may be used, for example, to model a baseball, basketball or globe of the earth. The low-resolution 3D model 105 is a simple mesh having a plurality of triangles. The high-resolution 3D model 110 is a more complex mesh having many times more triangles than the low-resolution 3D model 105. Since the low-resolution 3D model 105 is comprised of relatively fewer triangles than the high-resolution 3D model 110, the low-resolution 3D model 105 lacks detail and does not appear to be as smooth as the high-resolution 3D model 110.

As is described in further detail below in conjunction with FIGS. 2A-2B and FIGS. 3A-3F, the present invention enables geometry information and mapping data to be defined for points on the surface of the high-resolution 3D model 110 (hereinafter referred to as "high-resolution points") based on the geometry information and mapping data associated with the vertices of the low-resolution 3D model 105. Once that geometry information and mapping data has been defined, the content of a bitmap, such as a 2D image file or a texture map, that has been previously mapped to the vertices of the low-resolution 3D model 105 may be mapped directly onto the high-resolution 3D model 110. Thus, the present invention provides a flexible and efficient way to build a 3D image or scene using a low-resolution 3D model yet provide a level of detail similar to the level of detail that would be provided had the 3D image or scene been built using a high-resolution 3D model.

In one embodiment, the projection cage 115 is an expansion of the low-resolution 3D model 105 and includes a corresponding triangle for each triangle of the low-resolution 3D model 105. As also described in FIGS. 2A-2B and FIGS. 3A-3H, the projection cage 115 is expanded to encompass both the low-resolution 3D model 105 and the high-resolution 3D model 110 during the process of defining the geometry information and mapping data for each of the high-resolution points on the surface of the high-resolution 3D model 110.

Figure 2A:
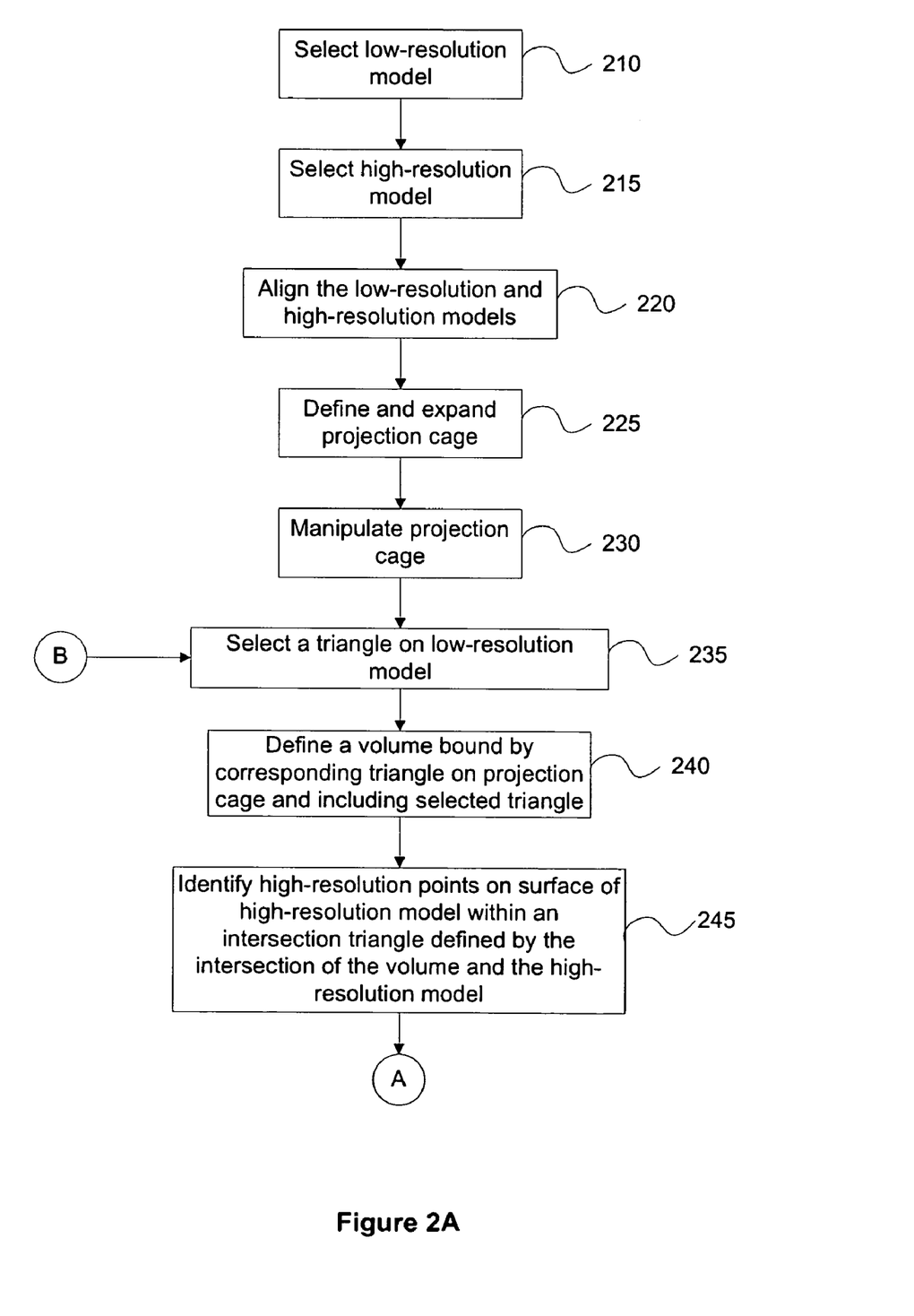
FIGS. 2A and 2B set forth a flow diagram of method steps for mapping content of a bitmap to a high-resolution 3D model, according to one embodiment of the invention.
Figure 2B:
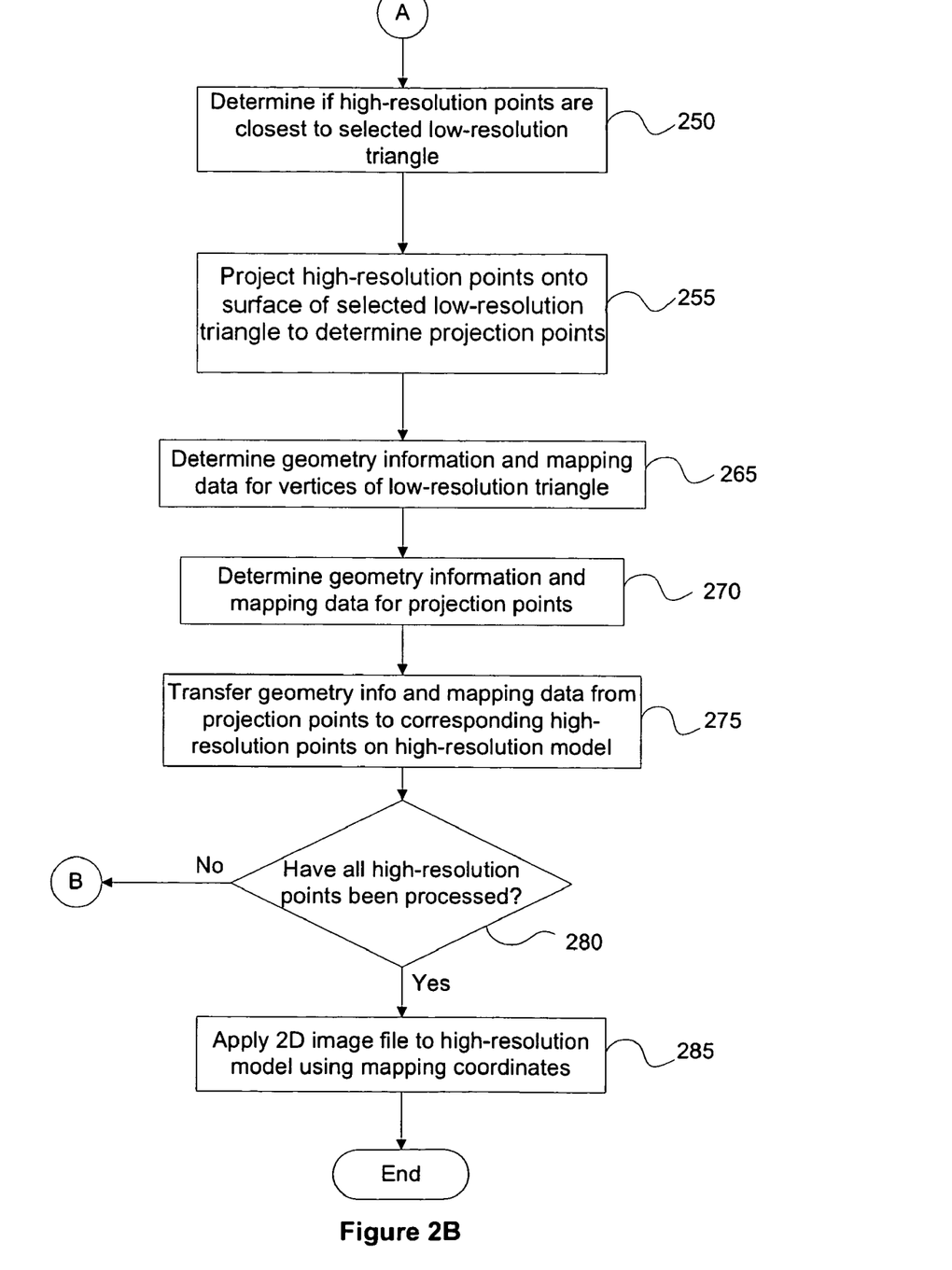

FIGS. 2A and 2B set forth a flow diagram of method steps for mapping content of a bitmap to a high-resolution 3D model, according to one embodiment of the invention. FIGS. 3A-3F are cross-referenced herein to provide the reader with a more comprehensive description of the method of FIGS. 2A and 2B. Persons skilled in the art will recognize that any system configured to perform the method steps is within the scope of the invention.

The method for mapping content of a bitmap onto a high-resolution 3D model begins in step 210, where the user selects a low-resolution 3D model. The low-resolution 3D model may any 3D model previously designed by the user or otherwise. Associated with the vertices of the low-resolution 3D model is geometry information and mapping data. The geometry information defines, among other things, the position of the vertices of the low-resolution 3D model within the 3D image or scene being built by the user. The mapping data defines the mapping relationships between the vertices of the low-resolution 3D model and corresponding locations within a bitmap, such as a 2D image file or texture map. As is well-known, the mapping data enables the content of the bitmap to be mapped onto the low-resolution 3D model.

Figure 3A:
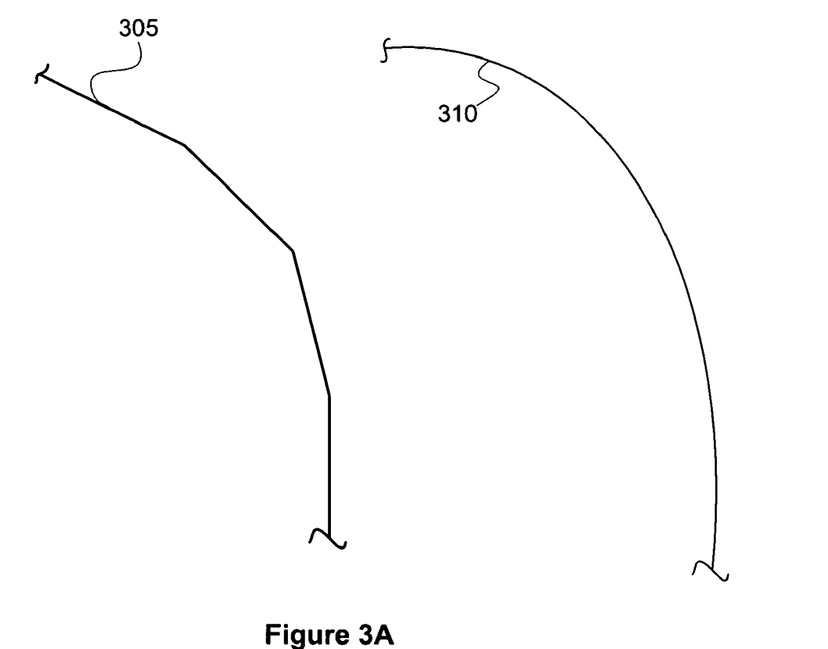
FIG. 3A is an illustration of a cross-sectional view of a portion of a low-resolution 3D model of a sphere and a portion of a high-resolution 3D model of a sphere, according to one embodiment of the invention.

In step 215, the user selects a high-resolution 3D model. Again, the high-resolution 3D model may be any previously designed high-resolution 3D model. Typically, the high-resolution 3D model is a version of the low-resolution 3D model that is comprised of many times more triangles than the low-resolution 3D model. FIG. 3A is an illustration of a cross-sectional view of a portion of a low-resolution 3D model of a sphere 305 and a portion of a high-resolution 3D model of a sphere 310. In one embodiment, the low-resolution 3D model 305 is substantially similar to the low-resolution 3D model 105 of FIG. 1, and the high-resolution 3D model 310 is substantially similar to the high-resolution 3D model 110 of FIG. 1.

Figure 3B:
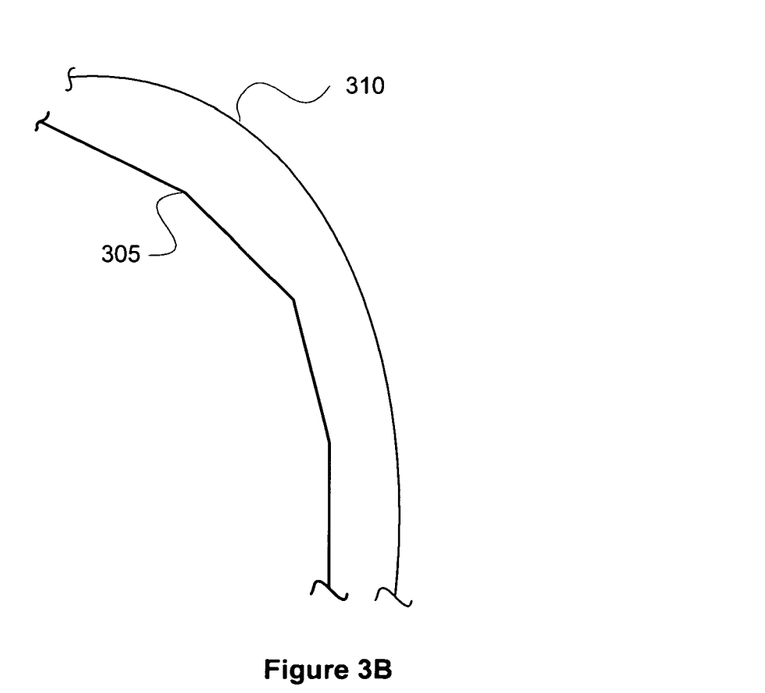
FIG. 3B is an illustration of the low-resolution 3D model aligned with the high-resolution 3D model, according to one embodiment of the invention.

In step 220, the user aligns the high-resolution 3D model 310 with the low-resolution 3D model 305. The user may perform this step, for example, by selecting and dragging the high-resolution 3D model 310 with a mouse cursor until the desired alignment is achieved. The user also could select and drag the low-resolution 3D model 105 until the desired alignment is achieved. In one embodiment, the appropriate alignment is achieved when the low-resolution 3D model 305 and the high-resolution 3D model 310 are substantially coincident with one another. FIG. 3B is an illustration of the low-resolution 3D model 305 aligned with the high-resolution 3D model 310.

Figure 3C:
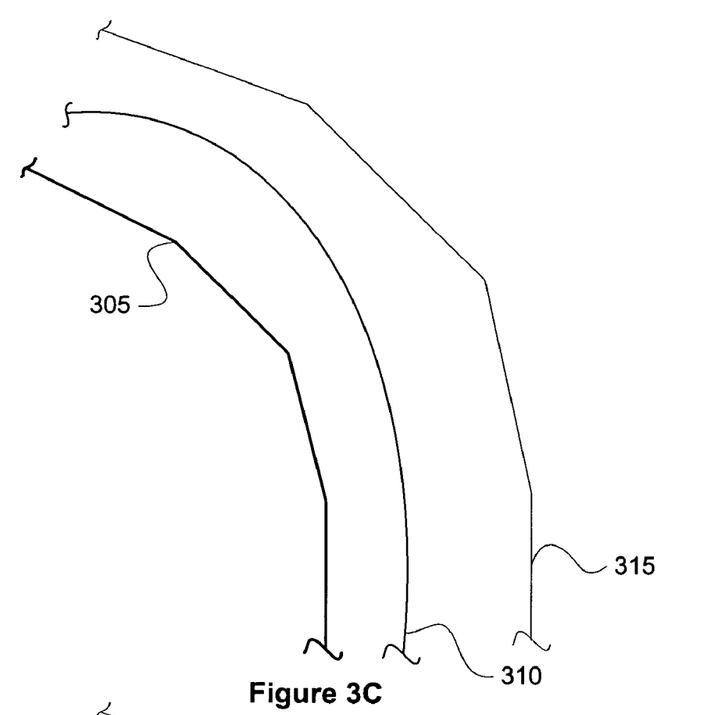
FIG. 3C is an illustration of a projection cage expanded to encompass the low-resolution 3D mode and the high-resolution 3D model, according to one embodiment of the invention.

In step 225, a projection engine in a 3D graphics program defines a projection cage and then expands the projection cage to substantially encompass both the low-resolution 3D model 305 and the high-resolution 3D model 310. The projection cage is defined based on the low-resolution 3D model 305 such that the projection cage has substantially the same shape as the low-resolution 3D model 305. For example, in one embodiment, the projection cage has a corresponding triangle for each triangle of the low-resolution 3D model 305. In one embodiment, the projection cage is expanded by calculating the volume of the low-resolution 3D model 305 and then pushing each triangle of the projection cage 315 outward in a direction normal to the corresponding triangle of the low-resolution 3D model 305 until the volume enclosed by the projection cage 315 is greater than the volume enclosed by the low-resolution 3D model 305 by a certain fixed percentage. FIG. 3C is an illustration of a projection cage 315 expanded to encompass both the low-resolution 3D model 305 and the high-resolution 3D model 310, according to one embodiment of the invention. In one embodiment, the projection cage 315 is substantially similar to the projection cage 115 of FIG. 1.

There may be some high-resolution 3D model geometries not well-suited for uniformly expanded the projection cage 315. For example, some high-resolution 3D model geometries may be shaped such that certain triangles of the high-resolution are not encompassed by the projection cage 315 when the projection cage 315 is uniformly expanded. Thus, in step 230, the user may manipulate individual sections of the projection cage 315 to optimize the position of the triangles of the projection cage 315 relative to the high-resolution 3D model 310 and to ensure that the entire high-resolution 3D model 310 is encompassed by the projection cage 315. This step is optional and may be omitted if the user determines that the projection cage 315 sufficiently encompasses the high-resolution 3D model 310. Referring back to FIG. 3C, the projection cage 315 is shown to completely encompass the high-resolution 3D model 310. Therefore, in this exemplary case, the projection cage 115 does not need to be manipulated by the user, and step 230 may be omitted.

Figure 3D:
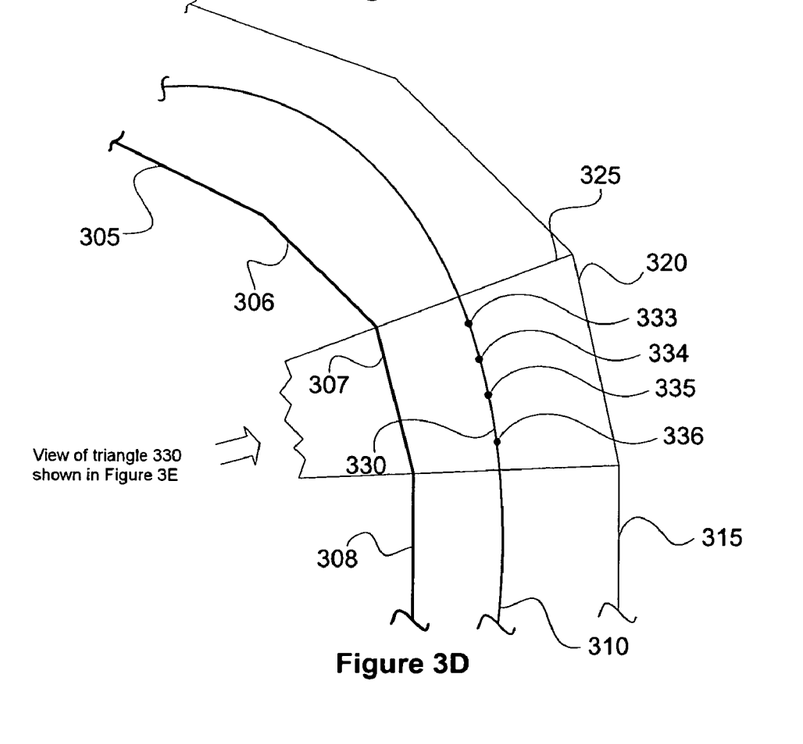
FIGS. 3D and 3E illustrate the use of a volume extending from a triangle of the projection cage through a corresponding triangle of the low-resolution 3D model to identify high-resolution points on the surface of the high-resolution 3D model, according to one embodiment of the invention.

In step 235, the projection engine selects a triangle of the low-resolution 3D model 305. As shown in FIG. 3D, by way of example, the projection engine selects a triangle 307 of the low-resolution 3D model 305. In step 240, the projection engine defines a volume that extends infinitely from a triangle of the projection cage 315 that corresponds to the selected triangle in the direction of the low-resolution 3D model 305 and includes the selected triangle. The defined volume has no further bounds. Referring back to FIG. 3D, in step 240, the projection engine defines a volume 325, which is bound on one end by a triangle 320 of the projection cage 315 corresponding to the selected low-resolution triangle 307 and includes the selected low-resolution triangle 307 of the low-resolution 3D model 305. Since the volume 325 is infinite, FIG. 3D shows only a portion of the volume 325.

Figure 3E:
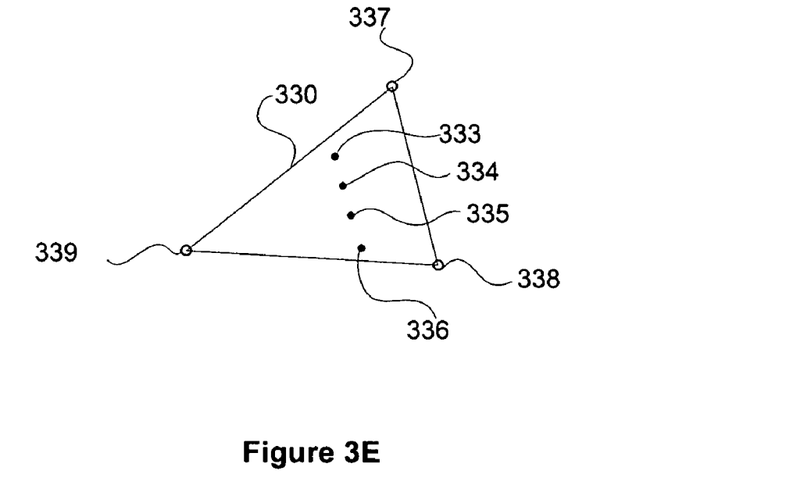

In step 245, the projection engine identifies high-resolution points on the surface of the high-resolution 3D model 310 within an intersection triangle defined by the intersection of the volume defined in step 240 and the surface of the high-resolution 3D model 310. Referring again to FIG. 3D, the projection engine identifies high-resolution points 333, 334, 335 and 336 on the surface of the high-resolution 3D model 310 within an intersection triangle 330 defined by the intersection of the volume 325 and the surface of the high-resolution 3D model 310. FIG. 3E illustrates another view of the intersection triangle 330 and high-resolution points 333, 334, 335 and 336.

There may be a case in which an identified high-resolution point within the intersection triangle 330 falls within more than one intersection triangle defined by the intersections of the volumes defined in step 240 and the surface of the high-resolution 3D model 310. In such a case, in step 250, the projection engine determines if the selected triangle is the triangle of the low-resolution 3D model 305 located closest to the identified high-resolution point. In one embodiment, the projection engine determines the distance between the high-resolution point and the centers of the different triangles of the low-resolution 3D model 305. If the distance between the high-resolution point and the selected triangle is the shortest distance, then the projection engine selects the identified high-resolution point to use in the projection and interpolation steps described below. Otherwise, the identified high-resolution point is not selected, and the projection engine performs the same analysis for each of the other identified high-resolution points within the intersection triangle 330. For purposes of example only, it is assumed that selected low-resolution triangle 307 is the triangle of the low-resolution 3D model 305 disposed closest to each of the identified high-resolution points 333, 334, 335 and 336. Therefore, all of the high-resolution points 333, 334, 335 and 336 are used in the projection and interpolation steps described herein.

In step 255, the projection engine projects the high-resolution points on the surface of the high-resolution 3D model 310 onto the surface of the selected low-resolution triangle 307 to determine projection points that correspond to the high-resolution points. In one embodiment, the projection engine first locates the high-resolution points within the intersection triangle 330 using barycentric coordinates. Barycentric coordinates are a well-known way of representing the location of a point within a triangle using three numbers indicating a weighting of the three vertices of the triangle to describe the position of a point. The sum of the three barycentric coordinates equals one, and the weight reflected by each coordinate reflects how close the point is located to a corresponding vertex of the triangle. The projection engine determines the barycentric coordinates of the high-resolution points 333, 334, 335 and 336 within the intersection triangle 330. For example, referring back to FIG. 3E, point 333 may have the barycentric coordinates (a1, b1, c1) based on the vertices 337, 338 and 339.

The projection engine then uses the barycentric coordinates of each high-resolution point to determines a corresponding projection point on the surface of the selected low-resolution triangle 307. More specifically, for each of high-resolution points 333, 334, 335 and 336, the projection engine determines the point on the surface of the selected low-resolution triangle 307 having the same barycentric coordinates as the high-resolution point. Each such point on the surface of the selected low-resolution triangle 307 constitutes a projection point. Thus, there is a one-to-one correspondence between the high-resolution points and the projection points.

Figure 3F:
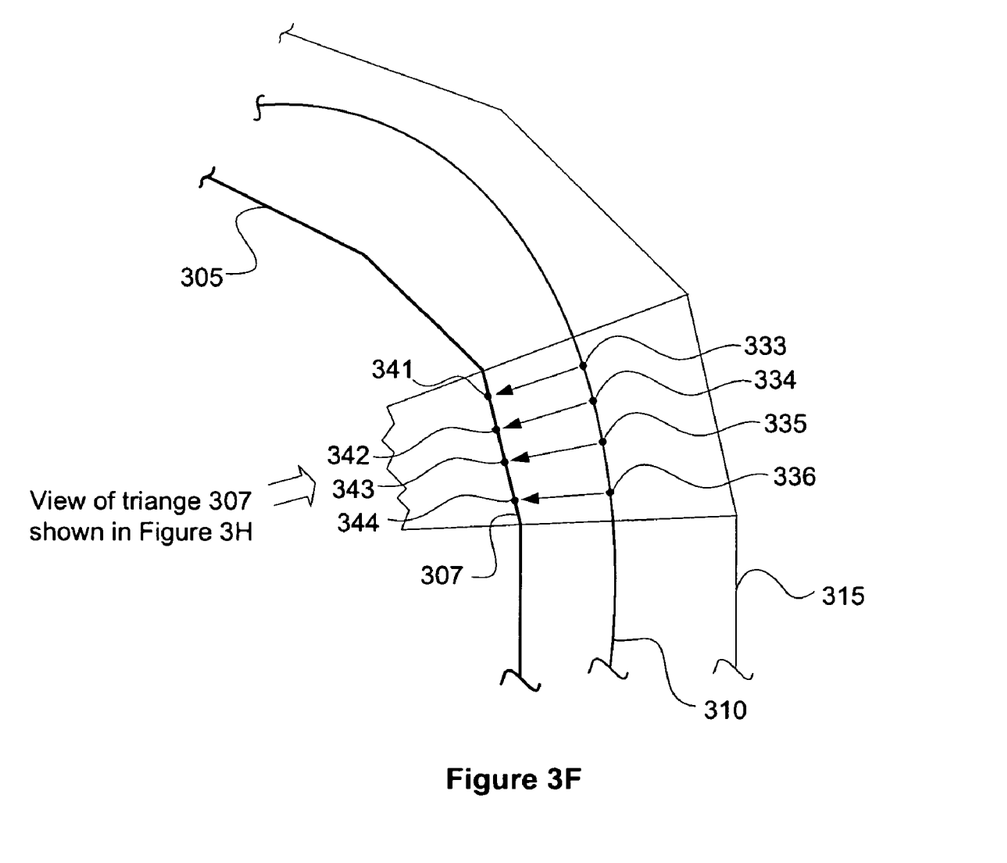
FIGS. 3F, 3G and 3H illustrate the projection of the high-resolution points residing within the intersection triangle of FIGS. 3D and 3E onto the surface of the corresponding triangle of the low-resolution 3D model to determine projection points, according to one embodiment of the invention.
Figure 3G:
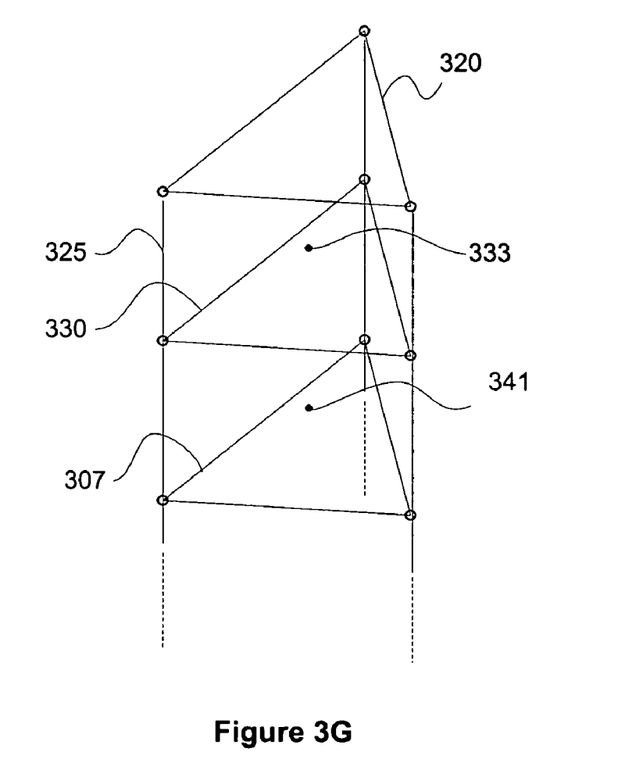
Figure 3H:
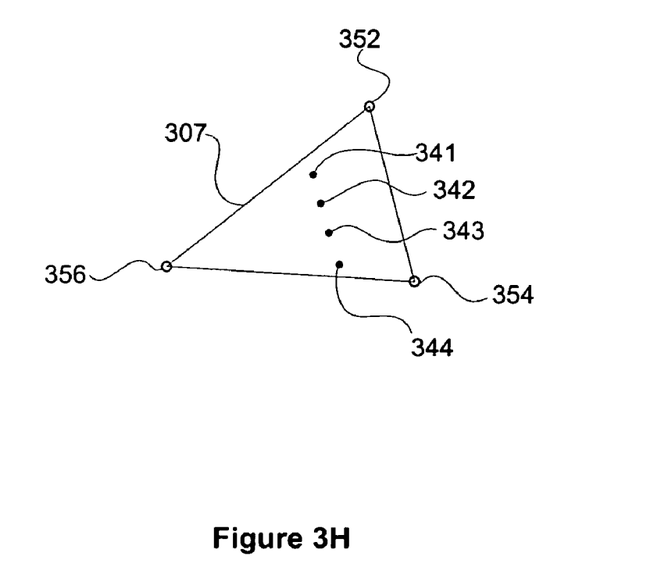

FIGS. 3F, 3G and 3H illustrate the projection of the high-resolution points 333, 334, 335 and 336 onto the surface of the selected low-resolution triangle 307 to determine the corresponding projection points 341, 342, 343 and 344. As shown in FIG. 3F, the projection point 341 on the surface of the selected low-resolution triangle 307 corresponds to the high-resolution point 333 located within the intersection triangle 330. As described above, the projection point 341 and the high-resolution point 333 have the same barycentric coordinates. The difference, however, is that the position of the high-resolution point 333 is defined within the intersection triangle 330 relative to vertices 337, 338 and 339 (as shown in FIG. 3E), and the position of the projection point 341 is defined on the surface of the selected low-resolution triangle 307 relative to vertices 352, 354 and 356 (as shown in FIG. 3H). For clarity, FIG. 3F does not show the projection of the other high-resolution points 334, 335 and 336. However, FIG. 3G conceptually illustrates the projection of the high-resolution points 333, 334, 335 and 336 onto the surface of the selected low-resolution triangle 307 and the resulting projection points 341, 342, 343 and 344.

In step 265, a projection mapping engine in the 3D graphics program determines the geometry information and the mapping data for the vertices of the selected low-resolution triangle 307 of the low-resolution 3D model 305. Again, the geometry information defines, among other things, the positions of the vertices of the low-resolution 3D model 305 within the 3D image or scene, and the mapping data defines the mapping between the vertices of the low-resolution 3D model 305 and corresponding locations within a bitmap, such as a 2D image file or texture map. FIG. 3H shows that the selected low-resolution triangle 307 of the low-resolution 3D model is comprised three vertices 352, 354 and 356. Associated with each vertex is known geometry information and mapping data.

In step 270, the projection mapping engine determines the geometry information and the mapping data for the projection points 341, 342, 343 and 344 on the surface of the selected low-resolution triangle 307. In one embodiment, the projection mapping engine interpolates between the geometry information and mapping data known for the vertices 352, 354 and 356 of the selected low resolution triangle 307 based on the positions of the projection points 341, 342, 343 and 344 relative to those vertices to determine the geometry information and the mapping data for the projection points 341, 342, 343 and 344. FIG. 3H shows the positional relationship between the projection points 341, 342, 343 and 344 and the vertices 352, 354 and 356. In step 275, the interpolated geometry information and mapping data is transferred from the projection points 341, 342, 343 and 344 to the corresponding high-resolution points 333, 334, 335 and 336 on the surface of the high-resolution 3D model 310.

In step 280, the projection mapping engine determines if all high-resolution points on the surface of the high-resolution 3D model 310 have been processed. If all high-resolution points have not been processed, then the method returns to step 235 of FIG. 2A. If, on the other hand, all high-resolution points have been processed, then the method proceeds to step 285, where a rendering engine applies the content of the bitmap to the high-resolution 3D model 310. The method then terminates.

In alternative embodiments, polygons other than triangles may be used for the low-resolution 3D model, the high-resolution 3D model and the projection cage. Further, the scope of the invention is not limited to the use of barycentric coordinates to project the high-resolution points from the surface of the high-resolution 3D model to the surface of the selected low-resolution triangle (or other polygon). The projection step may be performed in any other technically feasible fashion.

One advantage of the disclosed method is that it provides an efficient way to determine the mapping coordinates of a high-resolution 3D model based on the mapping coordinates of a low-resolution 3D model. Once the mapping coordinates of the high-resolution 3D model are determined, the content of a bitmap previously mapped to the low-resolution 3D model may be applied directly to the high-resolution 3D model using one or more methods known in the art. The method enables a user to develop a 3D image or scene using a low-resolution graphics model and then add detail to the 3D image or scene by mapping the content of a bitmap onto a high-resolution graphics model corresponding to the low-resolution graphics model in the manner described. The resulting 3D image or scene includes a level of detail substantially similar to the level of detail that would exist had the 3D image or scene been developed only with a high-resolution 3D model. Another advantage is that, if the user modifies the low-resolution 3D model after the manual mapping between vertices of the low-resolution 3D model and corresponding locations within the bitmap has been performed, then the only remapping required is between the vertices of the low-resolution 3D model and corresponding locations within the bitmap. The resulting remapping typically results in substantially less work than the prior art approach of having to manually remap the vertices of a high-resolution 3D model and corresponding points within the bitmap.

Figure 4:
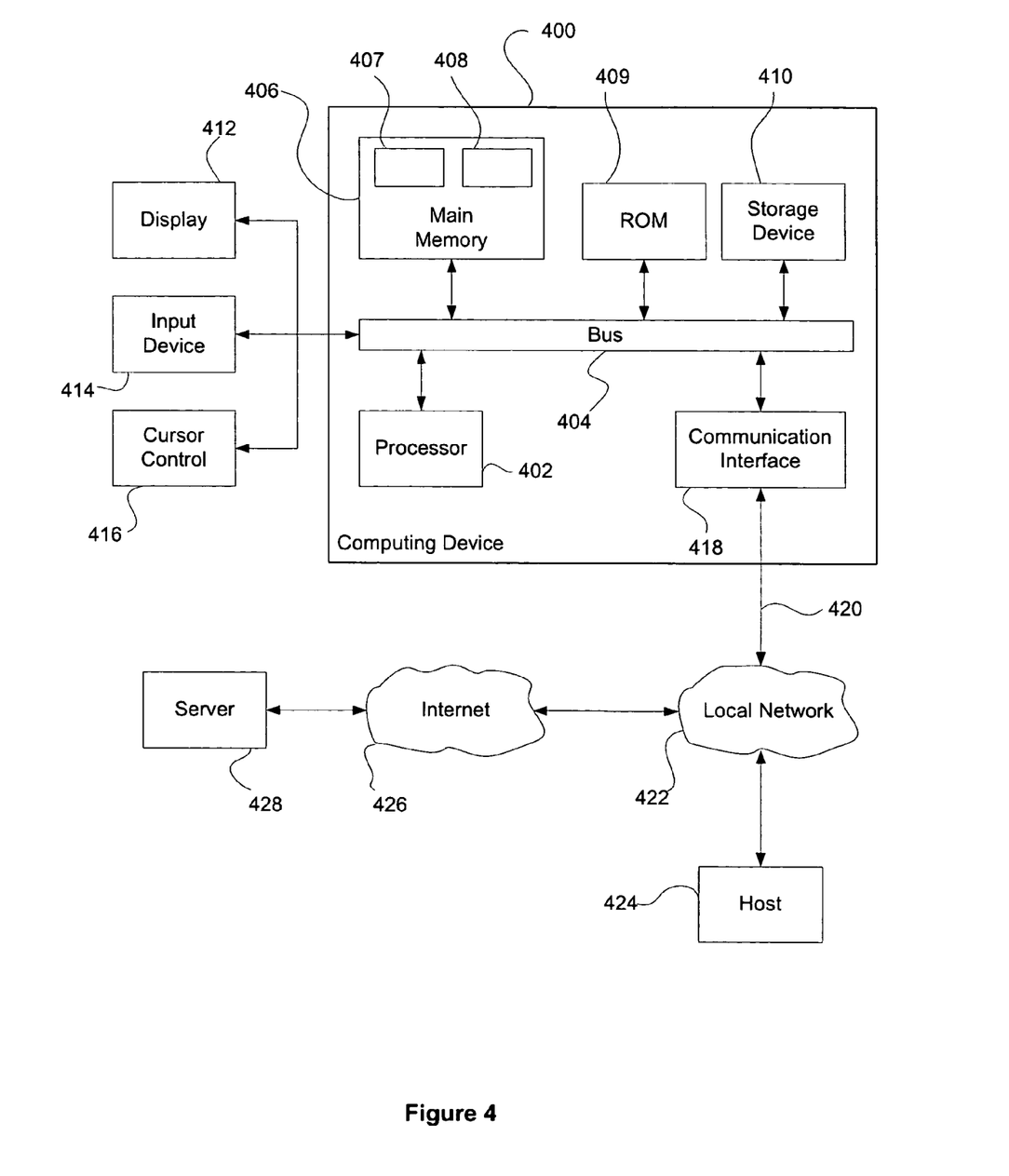
FIG. 4 is a conceptual diagram of a computing device that may be configured to implement one or more aspects of the present invention.

FIG. 4 is a conceptual diagram of a computing device that may be configured to implement one or more aspects of the present invention. Computing device 400 may be any type of computing device such as, for example, a desktop computer, a laptop computer, a server machine, a set-top box, a game system or console, a personal digital assistant or a cellular phone. As shown, computing device 400 includes, without limitation, a bus 404 for communicating information and a processor 402 coupled to bus 404 for processing information. Computing device 400 also includes a main memory 406, such as a random access memory or other dynamic storage device, for storing information and instructions to be executed by processor 402. For example, a projection engine 407 and a project mapping engine 408 of a 3D graphics application referenced above in conjunction with FIGS. 2A-2B may reside within main memory 406, and processor 402 may execute the instructions for implementing the method of FIGS. 2A-2B. Processor 402 may be a central processing unit (CPU), a graphics processor, any other type of special-purpose processor or a hardware state machine with special-purpose logic dedicated to implementing only the functionality of the disclosed method.

Computing device 400 may be coupled via bus 404 to a display 412 for displaying information to a user. An input device 414, including alphanumeric and other keys, is coupled to bus 404 for communicating commands and other information to processor 404. Another type of user input device is a cursor control 416, such as a mouse, trackball or direction keys, for communicating command selections and direction information to processor 402 and for controlling cursor position and movement on display 412. Computing device 400 also may include a communication interface 418 coupled to bus 404 that provides access to a local network 422 via a network link 420. Local network 422 may, in turn, couple computing device 400 to a host computer 424 or other device on local network 422, or may couple computing device 400 to more remote devices, such as server 428, through a wide area network, such as Internet 428.

While the foregoing is directed to embodiments of the present invention, other and further embodiments of the invention may be devised without departing from the basic scope thereof, and the scope thereof is determined by the claims that follow.

We claim:

1. A method for constructing mapping coordinates for a high-resolution graphics model, the method comprising:
    expanding a projection cage to substantially encompass both a low-resolution graphics model and the high-resolution graphics model;
    defining a volume that extends from a polygon of the projection cage through a corresponding polygon of the low-resolution graphics model;

determining points within an area on a surface of the high-resolution graphics model defined by an intersection of the volume and the high-resolution model; and for each point where the corresponding polygon is the closest polygon of the low-resolution graphics model to the point, projecting the point to the corresponding polygon to define a projection point on the corresponding polygon.

2. The method of claim 1, further comprising the step of determining geometry information and mapping data for each vertex of the corresponding polygon.

3. The method of claim 2, further comprising the step of determining geometry information and mapping data for each projection point based on the geometry information and mapping data associated with the vertices of the corresponding polygon.

4. The method of claim 3, further comprising the step of transferring the geometry information and mapping data associated with each projection point to the point on the surface of the high-resolution model corresponding to the projection point.

5. The method of claim 4, further comprising the step of applying the content of the bitmap to the high-resolution model using the mapping data associated with the points on the surface of the high-resolution model.

6. The method of claim 1, wherein the step of projecting the point to the corresponding polygon to define a projection point comprises determining barycentric coordinates for the point and determining the projection point on the corresponding polygon having the same barycentric coordinates.

7. The method of claim 6, wherein the corresponding polygon is a triangle.

8. The method of claim 1, wherein the corresponding polygon is the polygon of the low-resolution graphics model closest to the point on the surface of the high-resolution graphics model if a distance between the point and a center of the corresponding polygon is less than a distance between the point and a center of any other polygon of the low-resolution graphics model.

9. The method of claim 1, further comprising the step of aligning the low-resolution graphics model and the high-resolution graphics model in response to user input.

10. The method of claim 1, further comprising the step of altering the shape of the projection cage to fully encompass the high-resolution graphics model in response to user input.

11. A computer-readable medium storing instructions for causing a computing device to construct mapping coordinates for a high-resolution graphics model by performing the steps of:

expanding a projection cage to substantially encompass both a low-resolution graphics model and the high-resolution graphics model;

defining a volume that extends from a polygon of the projection cage through a corresponding polygon of the low-resolution graphics model;

determining points within an area on a surface of the high-resolution graphics model defined by an intersection of the volume and the high-resolution model; and for each point where the corresponding polygon is the closest polygon of the low-resolution graphics model to the point, projecting the point to the corresponding polygon to define a projection point on the corresponding polygon.

12. The computer-readable medium of claim 11, further comprising the step of determining geometry information and mapping data for each vertex of the corresponding polygon.

13. The computer-readable medium of claim 12, further comprising the step of determining geometry information and mapping data for each projection point based on the geometry information and mapping data associated with the vertices of the corresponding polygon.

14. The computer-readable medium of claim 13, further comprising the step of transferring the geometry information and mapping data associated with each projection point to the point on the surface of the high-resolution model corresponding to the projection point.

15. The computer-readable medium of claim 14, further comprising the step of applying the content of the bitmap to the high-resolution model using the mapping data associated with the points on the surface of the high-resolution model.

16. The computer-readable medium of claim 11, wherein the step of projecting the point to the corresponding polygon to define a projection point comprises determining barycentric coordinates for the point and determining a point on the corresponding polygon having the same barycentric coordinates.

17. The computer-readable medium of claim 16, wherein the corresponding polygon is a triangle.

18. The computer-readable medium of claim 11, wherein the corresponding polygon is the polygon of the low-resolution graphics model closest to the point on the surface of the high-resolution graphics model if a distance between the point and a center of the corresponding polygon is less than a distance between the point and a center of any other polygon of the low-resolution graphics model.

19. The computer-readable medium of claim 11, further comprising the step of aligning the low-resolution graphics model and the high-resolution graphics model in response to user input.

20. The computer-readable medium of claim 11, further comprising the step of altering the shape of the projection cage to fully encompass the high-resolution graphics model in response to user input.

* * * * *

UNITED STATES PATENT AND TRADEMARK OFFICE
CERTIFICATE OF CORRECTION

PATENT NO.         : 7,330,183 B1                                          Page 1 of 1
APPLICATION NO.    : 11/198050
DATED              : February 12, 2008
INVENTOR(S)        : Russo et al.

It is certified that error appears in the above-identified patent and that said Letters Patent is hereby corrected as shown below:

On the coversheet, please replace item (73) "NVIDIA Corporation, Santa Clara, CA (US)" with --AUTODESK, Inc., San Rafael, CA (US)--

Signed and Sealed this

Ninth Day of June, 2009

JOHN DOLL
*Acting Director of the United States Patent and Trademark Office*